US010544883B2

United States Patent
Davies et al.

(10) Patent No.: US 10,544,883 B2
(45) Date of Patent: Jan. 28, 2020

(54) CONDUIT SEAL ASSEMBLY

(71) Applicant: CONOCOPHILLIPS COMPANY, Houston, TX (US)

(72) Inventors: Paul R. Davies, Richmond, TX (US); Emery Jay Thomas, Sugar Land, TX (US); James L. Harris, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 479 days.

(21) Appl. No.: 14/567,371

(22) Filed: Dec. 11, 2014

(65) Prior Publication Data

US 2015/0184776 A1     Jul. 2, 2015

Related U.S. Application Data

(60) Provisional application No. 61/921,126, filed on Dec. 27, 2013.

(51) Int. Cl.
| | |
|---|---|
| *F16L 5/02* | (2006.01) |
| *F16L 55/00* | (2006.01) |
| *F25J 1/00* | (2006.01) |
| *F25J 1/02* | (2006.01) |
| *F25J 3/04* | (2006.01) |

(Continued)

(52) U.S. Cl.
CPC .............. *F16L 5/02* (2013.01); *F16L 55/00* (2013.01); *F25J 1/0022* (2013.01); *F25J 1/0261* (2013.01); *F25J 3/04945* (2013.01); *H02G 3/22* (2013.01); *H02G 15/013* (2013.01); *F25J 2290/30* (2013.01)

(58) Field of Classification Search
CPC ...... F25J 1/0022; H02G 3/022; H02G 15/013; F16L 5/02; F16L 5/10
See application file for complete search history.

(56) References Cited

U.S. PATENT DOCUMENTS

| | | | |
|---|---|---|---|
| 3,487,536 A | * | 1/1970 | Goldstein ............. C04B 37/026 228/124.1 |
| 4,138,183 A | * | 2/1979 | Soos .................... H01R 13/533 439/161 |
| 4,658,847 A | | 4/1987 | McCrone |

(Continued)

FOREIGN PATENT DOCUMENTS

| | | |
|---|---|---|
| EP | 1437783 A1 | 7/2004 |
| GB | 2217871 A1 | 11/1989 |

OTHER PUBLICATIONS

"A guide to Sealing Cryogenic and Low Temperature Applications" AESSEAL 2004 http://arthomson.com/wp-content/uploads/2013/04/Resources-Mechanical-AESSEAL-Guides-CRYOGENIC.pdf.*

(Continued)

*Primary Examiner* — Keith M Raymond
(74) *Attorney, Agent, or Firm* — Boulware & Valoir

(57) ABSTRACT

A conduit seal assembly includes an outer conduit having a first end with a first opening and a second end, opposite the first end, with a second opening. A first seal is positioned in the first opening for resisting a first temperature, and a second seal is positioned in the second opening for resisting a second temperature less than the first temperature. The first and second seals define a cavity and provide an air-tight seal of the cavity, and the assembly includes a monitoring assembly configured to sense a characteristic in the cavity.

12 Claims, 3 Drawing Sheets

(51) Int. Cl.
*H02G 3/22* (2006.01)
*H02G 15/013* (2006.01)

(56) References Cited

U.S. PATENT DOCUMENTS

| | | | | |
|---|---|---|---|---|
| 4,676,574 | A * | 6/1987 | Grosso | H01R 13/527 |
| | | | | 439/271 |
| 7,772,506 | B2 * | 8/2010 | Suter | G02B 6/4428 |
| | | | | 137/797 |
| 8,092,878 | B2 * | 1/2012 | Miller | A01N 1/02 |
| | | | | 215/247 |
| 8,360,437 | B2 | 1/2013 | Beele | |
| 2009/0136286 | A1 * | 5/2009 | Kenney | F16L 5/02 |
| | | | | 403/51 |
| 2011/0018206 | A1 | 1/2011 | Beele | |
| 2012/0261415 | A1 * | 10/2012 | Wilkes | E04H 5/10 |
| | | | | 220/88.1 |
| 2014/0231133 | A1 | 8/2014 | Fritz et al. | |

OTHER PUBLICATIONS

International Search Report, PCT/US2014/069765, dated Mar. 16, 2015.
European Search Report for European Application No. 14875259.5 dated Feb. 17, 2017.
AESSEAL plc, Environmental Technology, "A Guide to Sealing Cryogenic and Low Temperature Applications", AES/DOC/IN 4902, Apr. 2004.

* cited by examiner

CONDUIT SEAL ASSEMBLY

CROSS-REFERENCE TO RELATED APPLICATIONS

This application is a non-provisional application which claims benefit under 35 USC § 119(e) to U.S. Provisional Application Ser. No. 61/921,126 filed Dec. 27, 2013, entitled "CONDUIT SEAL ASSEMBLY," which is incorporated herein in its entirety.

FIELD OF THE INVENTION

This invention relates to conduit seals, and in particular, to a conduit seal assembly including first and second seals at opposite ends of a conduit that penetrates a container.

BACKGROUND OF THE INVENTION

Gas processing applications for processing liquid gases, such as liquid natural gas (LNG) require cooling of gases into a liquid state for transport. Gas processing containers may be land-based or mobile. In a mobile platform, such as an offshore gas processing vehicle, a gas processing container may be used to house gas processing equipment. During operation, gas processing components and materials, such as refrigerating fluids, must be maintained at low temperatures less than 0 degrees Celsius including cryogenic temperatures, defined as temperatures around −150 degrees Celsius and below, to convert the gaseous materials to liquid. Accordingly, an inside of the gas processing container must be made of materials capable of withstanding cryogenic temperatures and operating pressure levels.

In addition, since gases are combustible, an outside of the gas processing container must be capable of withstanding high temperatures and impacts.

SUMMARY OF THE INVENTION

In one embodiment of the present invention, a conduit seal assembly includes an outer conduit having a first end with a first opening and a second end, opposite the first end, with a second opening. A first seal is positioned in the first opening for resisting a first temperature, and a second seal is positioned in the second opening for resisting a second temperature less than the first temperature. The first and second seals define a cavity and provide an air-tight seal of the cavity, and the assembly includes a monitoring assembly configured to sense a characteristic in the cavity.

In another embodiment, a gas processing container includes a plurality of walls configured to form a chamber having an air-tight seal, gas processing equipment in the chamber, at least some of the gas processing equipment configured to operate inside the chamber at cryogenic temperatures, and a conduit seal assembly including an outer conduit extending through a first wall of the plurality of walls. The conduit seal assembly includes an outer conduit having a first end with a first opening and a second end, opposite the first end, with a second opening. A first seal is located in the first opening for resisting a first range of temperatures and a second seal is located in the second opening for resisting a second range of temperatures that extends below the first range of temperatures. The first and second seals define a cavity and provide an air-tight seal of the cavity.

In another embodiment, a conduit seal assembly includes an outer conduit having a first end with a first opening and a second end, opposite the first end, with a second opening. A first seal is positioned in the first opening for resisting a first temperature, and a second seal is positioned in the second opening for resisting a second temperature less than the first temperature. The first and second seals define a cavity and provide a fluid-tight seal of the cavity. The conduit seal assembly includes an inner conduit extending through the outer conduit. The first and second seals surround the inner conduit to maintain the fluid-tight seal of the cavity.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variation can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

Figure 1:
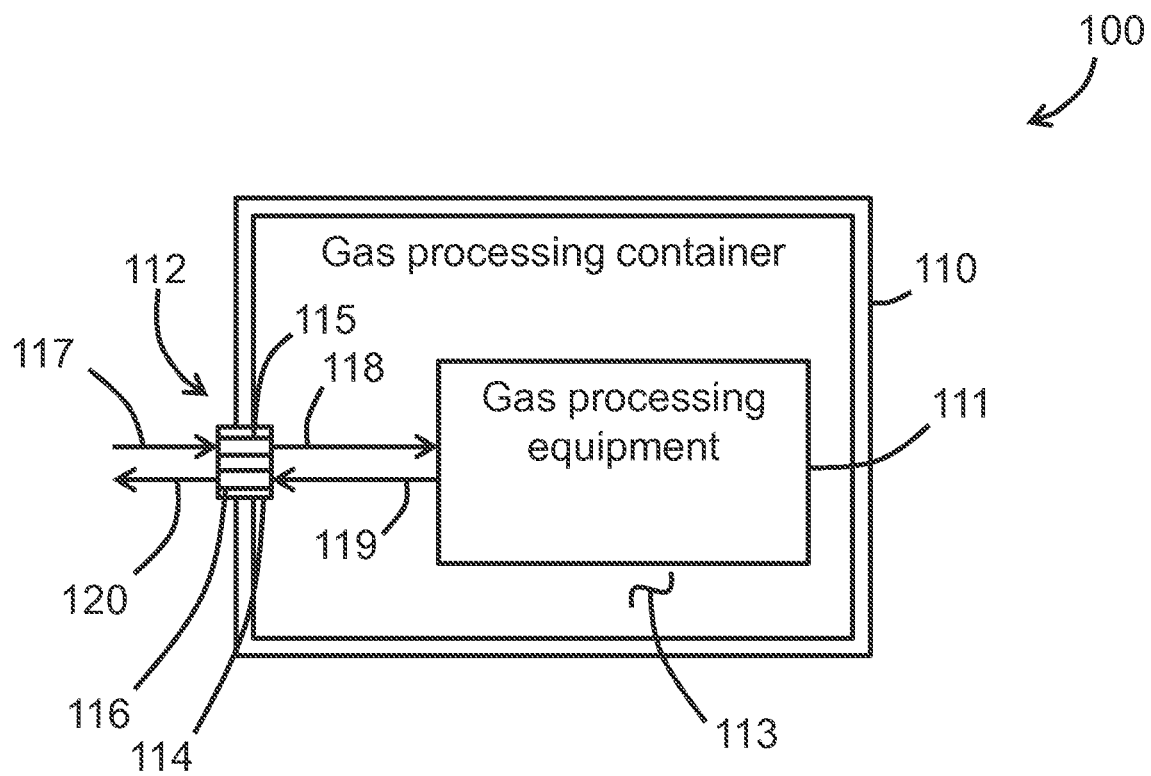
FIG. 1 illustrates a gas processing system according to one embodiment of the present invention.

FIG. 1 illustrates a gas processing system 100 according to an embodiment of the invention. The gas processing system 100 includes a gas processing container 110 having stored therein gas processing equipment 111. A conduit seal assembly 112 is located in a first wall 110a of the gas processing container 110. The gas processing container 110 includes additional walls 110b, 110c, and 110d, as well as end walls that are omitted from FIG. 1 for purposes of description. In one embodiment, the gas processing container 110 is a cube or a shape having a rectangular cross-section, but embodiments of the invention encompass gas processing containers 110 of any shape, including irregular shapes, spherical shapes, cylindrical shapes, or any other three-dimensional shape capable of defining a chamber 113 to maintain a fluid-tight seal of the chamber 113. In some embodiments, the gas processing container 110 is configured to maintain a fluid-tight seal while the cavity 113 is at an internal pressure of 500 millibars (mbar) or more. In some embodiments, the gas processing container 110 is configured to maintain an air-tight seal, although embodiments encompass any fluid-tight seal, such as a seal sufficient to withstand a gas purge, such as a nitrogen gas purge, of the cavity 113.

The conduit seal assembly 112 includes an external conduit 114 a first inner conduit 115 and a second inner conduit 116. The inner conduits 115 and 116 are provided by way of example, and embodiments of the invention are not limited to two inner conduits 115 and 116. Instead, embodiments of the invention encompass any number of inner conduits, from zero inner conduits to three or more. For example, in one embodiment, insulated wiring may extend through the outer conduit 114 without any inner conduit. In another embodiment, one of the inner conduits 115 and 116 may have wiring pass through an inner channel defined by the conduit 115 or 116, and the conduit 115 or 116 may be filled with a sealant to maintain the seal in the gas processing container 110.

In embodiments of the invention, the outer conduit 114 and inner conduits 115 and 116 may be formed of any material, according to the design requirements of the gas processing system 100. For example, the outer conduit 114 and inner conduits 115 and 116 may be made of metals, plastics, polymers and composites. In one embodiment, one or more of the outer conduit 114 and inner conduits 115 and 116 is made of carbon steel, stainless steel, or a combination of carbon steel and stainless steel. In one embodiment, the outer conduit 114 is a tube, although embodiments of the invention encompass any structure having openings at the ends to permit conduits, wires, or other structures to pass through a channel defined by the outer conduit 114. Similarly, the inner conduits 115 and 116 may be tubes of any other shape that permits passage of wiring, fluids, or other materials through a channel defined by the inner conduits 115 and 116.

In one embodiment, the first inner conduit 115 receives a fluid from a first transmission path 117 and passes the fluid to the gas processing equipment 111 via a second transmission path 118. The gas processing equipment 111 may output the fluid or another fluid via a third transmission path 119, and the second inner conduit 116 may transmit the fluid from the third transmission path 119 outside the gas processing container 110 via a fourth transmission path 120. In embodiments of the invention, the fluid may include a coolant, a refrigerant, a heating fluid, a lubricant, methane gas, natural gas, liquid natural gas, liquid methane, propane, water, fuel, or any other fluid. In such embodiments, the first, second, third, and fourth transmission paths 117, 118, 119, and 120 are pipes. However, in other embodiments, the first, second, third, and fourth transmission paths 117, 118, 119, and 120 may be wires. The wires may pass through the first and second inner conduits 115 and 116. In another embodiment, the first and second inner conduits are solid conductive materials or coils that are connected to wires, such that the wires do not pass through the first and second inner conduits 115 and 116, but instead the first and second inner conduits 115 and 116 relay power or signals into and out from the gas processing container 110.

In one embodiment, the walls 110a to 110d of the gas processing container 110 are made of materials capable of resisting blasts, extreme high temperatures, and extreme low temperatures. For example, the walls 110a to 110d may include an inner wall and an outer wall, the inner walls may be formed of materials capable of resisting extreme cold, such as cryogenic, temperatures, and the outer walls may be formed of materials capable of resisting extreme heat, such as combustion temperatures. The outer walls may also be formed of materials capable of resisting one or more of blast pressures and corrosion, such as salt corrosion.

Figure 2:
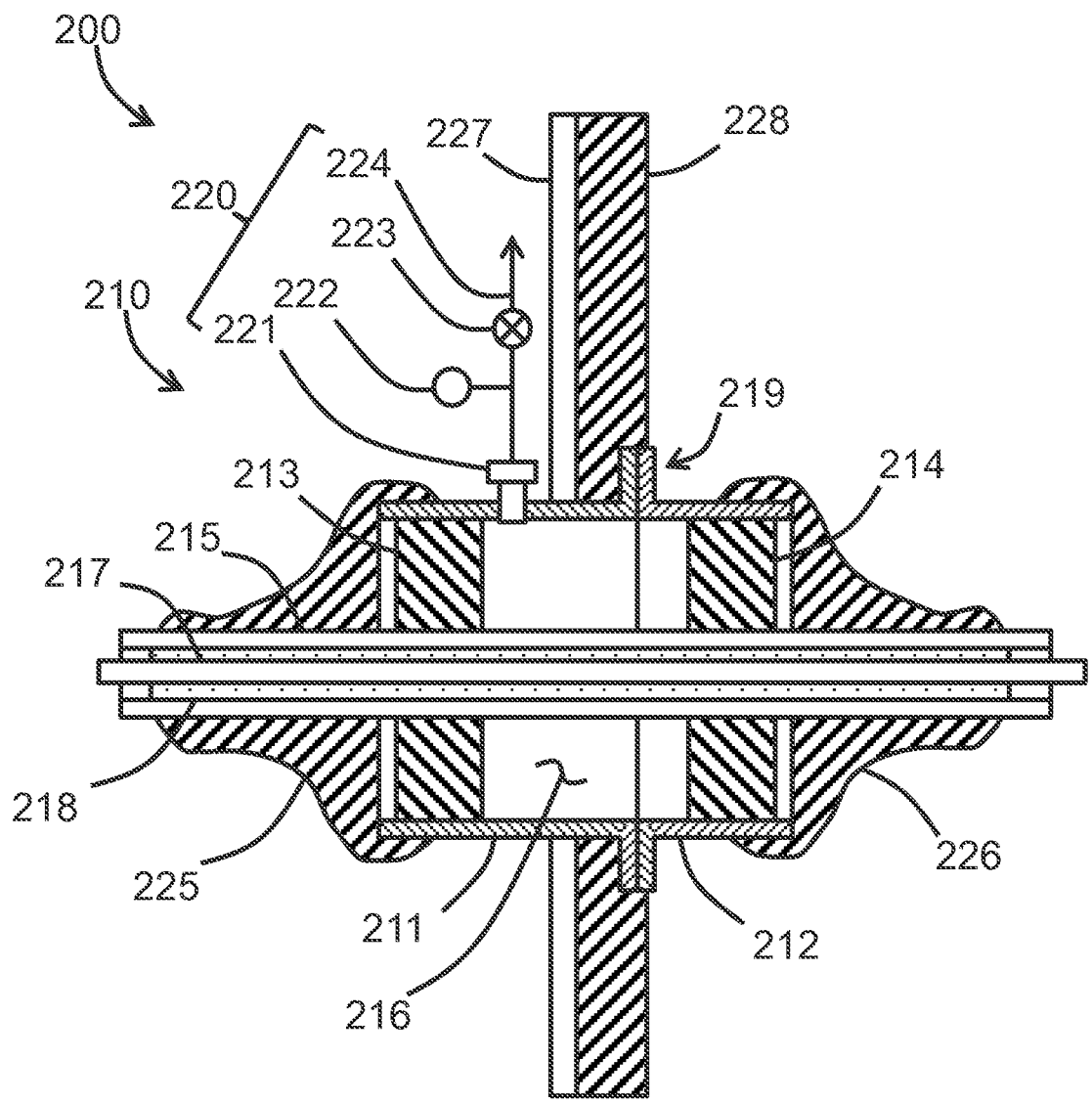
FIG. 2 illustrates a container penetration region including a conduit seal assembly according to an embodiment of the invention.

FIG. 2 illustrates a container penetration region 200, where the conduit seal assembly 210 penetrates the wall 227 of the gas processing container. The conduit seal assembly 210 corresponds to the conduit seal assembly 112 of FIG. 1. As illustrated in FIG. 2, the conduit seal assembly 210 penetrates the wall 227 and extends onto both sides of the wall 227. An insulation layer 228 may be located on an inside surface of the wall 227. The conduit seal assembly 210 includes a first section 211 and a second section 212, connected at a flange section 219. The first second 211 and the second section 212 together form an outer conduit 211/212. The first section 211 and the second section 212 are co-axial, such that inside surfaces of the first and second sections 211 and 212 are substantially flush and co-planar with each other. In one embodiment, the first section 211 is made of a first material and the second section 212 is made of a second material. The first material may be a material that is resistant to physical shock and corrosion, and the second material may be resistant to cold. In one embodiment, the first material is carbon steel and the second material is stainless steel. In one embodiment, the insulation layer 228 has a thickness sufficient to cover the portion of the first section 211 that extends into the gas processing container.

The conduit seal assembly 210 includes a first seal 213 at a first end of the outer conduit 211/212 and a second seal 214 at a second end of the outer conduit 211/212. The first and second seals 213 and 214 and the outer conduit 211/212 define a cavity 216. The first and second seals 213 and 214 maintain a fluid-tight seal in the cavity 216. In one embodiment, the first seal 213 is configured to resist a first temperature or range of temperatures and the second seal 214 is configured to resist a second temperature or range of temperatures that is lower than the first temperature or range of temperatures. For example, in one embodiment, the first range of temperatures includes temperatures from 1000 degrees Celsius and above, and the second range of temperatures includes temperatures from −100 degrees Celsius and below. In another embodiment, the first range of temperatures includes temperatures from around 1500 degrees Celsius and above, and the second range of temperatures includes temperatures from around −150 degrees Celsius and below. In one embodiment, the first range of temperatures includes a range of temperatures around 1700 degrees Celsius, and the second range of temperatures includes temperatures around −170 degrees Celsius.

In one embodiment, the first seal 213 is configured to resists temperatures corresponding to explosions, flame, or other combustion events, and the second seal is made of a material for resisting cold, such as refrigerated air or gas or other cold fluids, including cryogenic fluids. In one embodiment, the first seal 213 is further made of a material capable of resisting (or maintaining the fluid-tight seal upon being subjected to) explosive pressures, and the second seal is made of a material capable of resisting (or maintaining the fluid-tight seal upon being subjected to) a pressurized internal chamber. In one embodiment, the first seal 213 is configured to resist an external pressure of around 1 gauge bar (barg), and the second seal 214 is configured to resists an internal pressure of around 500 mbars. In one embodiment, the first seal 213 is configured to resist an external pressure (or pressure from an atmosphere outside the gas processing container 110) of 1 gauge bar (barg) or more, and the second seal 214 is configured to resist an internal pressure (or pressure inside the gas processing container 110) of 500 mbars or more. In one embodiment, the second seal 214 is configured to resist an internal pressure of 500 mbar or more. In one embodiment, the duration at which the internal pressure is 500 mbar or more is a spike or short-term duration, and the second seal 214 is configured to withstand a sustained internal pressure of around 25 mbar.

The first and second seals 213 and 214 are arranged inside the outer conduit 211/212, such that the first and second seals 213 and 214 contact the inside surface of the outer conduit 211/212 to form the fluid-tight seal in the cavity 216. In one embodiment, the first and second seals 213 and 214 are affixed to the inside surface of the outer conduit 211/212 with an adhesive, such as a glue, tape, or any other adhesive. In one embodiment, the first and second seals 213 and 214 are pre-fabricated articles, such as a disc or annulus, that is positioned inside the outer conduit 211/212. In another embodiment, the first and second seals 213 and 214 are made up of a material that is applied in a liquid or semi-liquid form and hardens or sets to form the first and second seals 213 and 214. In embodiments of the invention, the first and second seals 213 and 214 may be made of one or more of rubber, epoxy, polymers, or any compounds of rubber, epoxy, and other polymers.

In one embodiment, the second seal 214 is made up of a non-cross-linked, non-crystalline, monolithic viscous polymer-based material having visco-elastic properties in the expected temperature range of operation. In one embodiment, the expected temperature range of operation includes cryogenic temperatures of −150 degrees Celsius or less. Such materials include visco-elastic sealing pastes, tapes, or pre-fabricated sealing articles. However, any qualified material may be used to form the second seal 214.

In one embodiment, the conduit seal assembly 210 includes an inner conduit 215 that extends axially through the cavity 216 of the outer conduit 211/212. The first and second seals 213 and 214 form a seal with the inner conduit 215. In one embodiment, the first and second seals 213 and 214 are made of a flexible material to maintain the fluid-tight seal in the cavity 216 when one or more of the wall 227, the outer conduit 211/212, and the inner conduit 215 bends, shifts, or moves. For example, while the inner conduit 215 is configured to pass through the outer conduit 211/212 along an axis parallel to the center axis of the outer conduit 211/212, the inner conduit 215 may shift due to externally-applied forces, so that the inner conduit 215 is arranged at an angle with respect to the center axis of the outer conduit 211/212. In such a circumstance, the seals 213 and 214 bend to conform to the arrangement of the inner conduit 215 to maintain the fluid-tight seal in the cavity 216. While the movement of the inner conduit 215 has been described by way of example, it is to be understood that embodiments of the invention encompass first and second seals 213 and 214 capable of flexing, compressing, and expanding to maintain a fluid-tight seal based on the outer conduit 211/212 bending or shifting.

In one embodiment, a wire 218 passes through the inner conduit 215, and a sealing material 218 fills the space in the inner conduit that surrounds the wire 217 to maintain a fluid-tight seal in the gas processing container. However, as discussed above, embodiments of the invention are not limited to conduits that have wires running through them, but also fluids or any other structures.

The conduit seal assembly 210 may also include an external boot 225 to further seal and protect the first end of the outer conduit 211/212, and an internal boot 226 to further seal and protect the second end of the outer conduit 211/212. Like the first seal, 213, the external boot 225 may be formed of a flexible material capable of resisting heat and explosive pressures. Like the second seal 214, the internal boot 226 may be formed of a flexible material capable of resisting cold and increased internal pressures. In one embodiment, the internal boot 226 is made of a material that maintains flexibility in a cryogenic temperature range of approximately −150 degrees Celsius or less. Example materials include qualified composite fabrics, low density foams, aerogel, or any other type of flexible blanket material. An inner surface of the external boot 225 contacts an outer surface of the first section 211 to form a seal, and the inner surface of the internal boot 226 contacts the outer surface of the second section 212 to form a seal. In one embodiment, the boots 225 and 226 are pre-fabricated articles having substantially bell-shaped outer surfaces, or having surfaces confirming to a shape of the outer conduit 211/212 that are attached to the outer conduit 211/212 after positioning or forming the first and second seals 213 and 214 in the outer conduit 211/212.

The conduit seal assembly 210 further includes a monitoring assembly 220 to monitor characteristics inside the cavity 216. The monitoring assembly 220 includes an outlet 221 to bleed atmosphere from inside the cavity 216, a sensor 222, a valve 223, and a venting conduit 224 to vent fluid from inside the cavity 216. The sensor 222 may be any type of sensor, including a temperature sensor, a pressure sensor, a strain sensor, an optical sensor, or any other type of sensor. The sensor 222 is located outside the chamber 113 defined by the gas processing container 110 of FIG. 1, and outside the cavity 216 of the outer conduit 211/212. The valve 223 may be controlled by the sensor 222, or by a controller, including a processor, that receives sensor data from the sensor 222, analyzes the sensor data, and generates a control signal to control the valve 223 to control the flow of fluid out from the cavity 216.

While the monitoring assembly 220 is illustrated with the outlet 221, sensor 222, valve 223 and venting conduit 224, embodiments of the invention encompass any configuration of a monitoring assembly, including only a sensor that is located on an outside surface of the outer conduit 211/212, inside the cavity 216, or extending into the cavity 216 from outside the outer conduit 211/212. In other words, embodiments of the invention encompass a monitoring unit having the valve 223 and venting conduit 224 omitted.

In one embodiment, the monitoring assembly 220 is located on or in the first section 211 of the outer conduit 211/212. However, embodiments of the invention are not limited to this configuration.

According to one example, the sensor 222 may be a temperature sensor and the presence of a leak in the cavity 216 may be detected by sensing a decrease in temperature in the fluid entering the outlet 221 from the cavity 216, indicating the leaking of fluid into the cavity 216 from the chamber 113 defined by the gas processing container 110 of FIG. 1. Conversely, an increase in temperature in the cavity 216 may indicate a leaking of a fluid through the first seal 213 from an atmosphere outside the cavity 216. While a few examples of sensors have been provided, embodiments of the invention encompass any sensor capable of sensing a characteristic inside the chamber 216 for any purpose.

Figure 3:
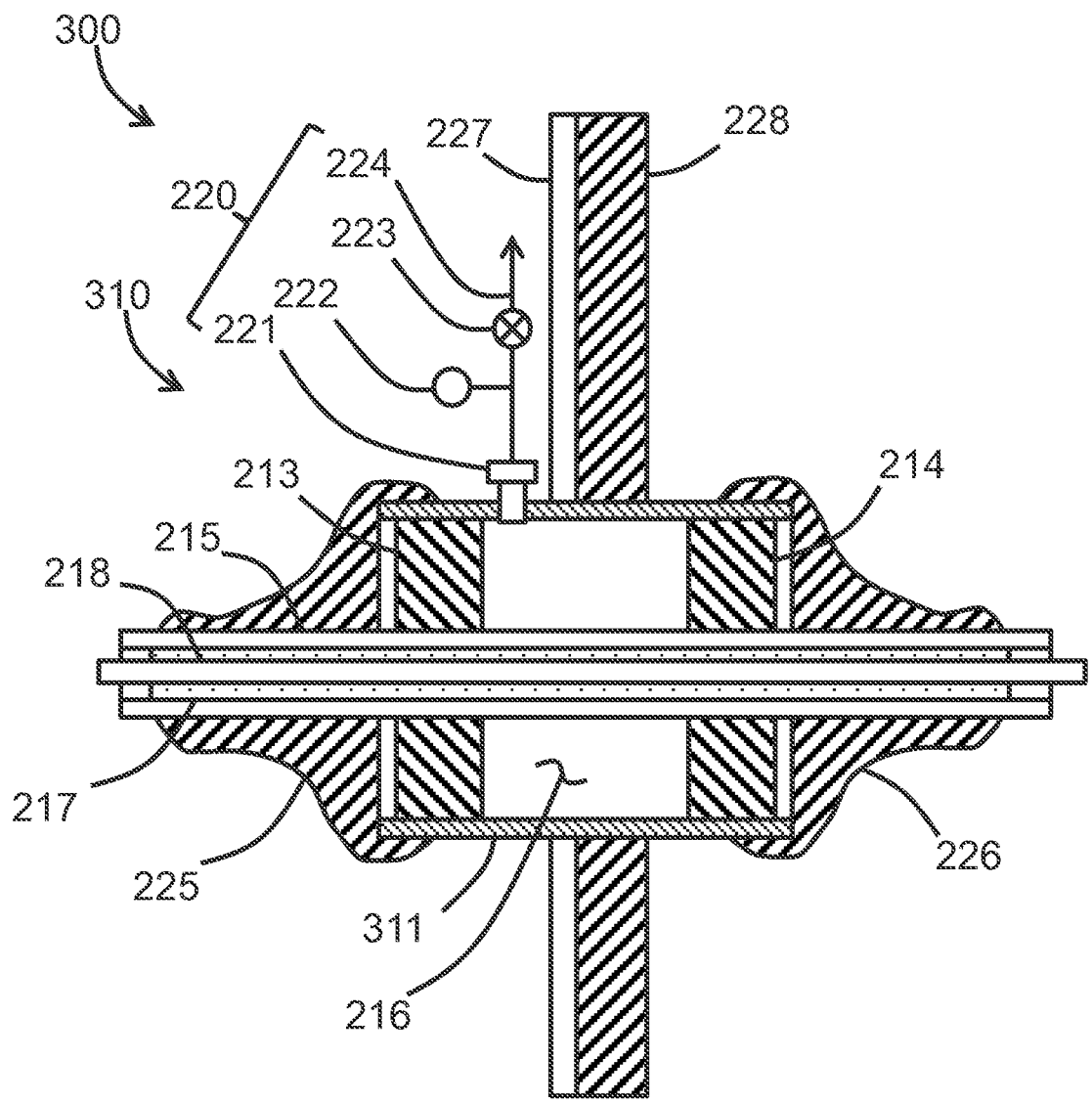
FIG. 3 illustrates a container penetration region according to another embodiment of the invention.

FIG. 3 illustrates a container penetration region 300 according to another embodiment. The container penetration region 300 is similar to the container penetration region 200 of FIG. 2, except instead of being formed of two sections 211 and 212, the conduit seal assembly 310 includes an outer conduit 311 formed of only one segment. In one embodiment, the entire outer conduit 311 is formed of a cold-resistant material, such as stainless steel.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

What is claimed is:

1. A gas processing container for liquefying gases, comprising:
   a plurality of walls configured to form a chamber having an air-tight seal;
   gas processing equipment in the chamber to convert gaseous materials to liquid, at least some of the gas processing equipment configured to operate inside the chamber at temperatures of 0 degrees Celsius or below; and
   a conduit seal assembly extending through a first wall of the plurality of walls, the conduit seal assembly comprising:
      an outer conduit having a first end with a first opening and a second end, opposite the first end, with a second opening;
      a first seal in the first opening for resisting a first range of temperatures;
      a second seal in the second opening for resisting a second range of temperatures that extends below the first range of temperatures, the first and second seals defining a cavity and providing an air-tight seal of the cavity; and
      a temperature-resistant internal boot that further protects the second end, wherein the temperature-resistant internal boot maintains flexibility at temperatures of −150 degrees Celsius and below.

2. The gas processing container of claim 1, wherein the outer conduit includes a first portion and a second portion that is axially aligned with the first portion such that the first and second portions together define outer walls of the cavity, the first portion comprising stainless steel and the second portion comprising at least one of carbon and stainless steel, the first portion located entirely inside the chamber and the second portion extending from inside the chamber through the first wall.

3. The gas processing container of claim 1, wherein the conduit seal assembly further comprises a monitoring assembly configured to sense a characteristic in the cavity.

4. The gas processing container of claim 3, wherein the monitoring assembly is configured to detect a leak in the cavity.

5. The gas processing container of claim 3, wherein the monitoring assembly is attached to an outer surface of the outer conduit.

6. The gas processing container of claim 3, wherein the monitoring assembly includes a sensor located inside the cavity.

7. The gas processing container of claim 3, wherein the monitoring assembly extends through a wall of the outer conduit.

8. The gas processing container of claim 1, wherein the conduit seal assembly further comprises an inner conduit extending through the first opening and the second opening, the first and second seals surrounding the inner conduit to maintain the air-tight seal.

9. The gas processing container of claim 1, wherein the plurality of walls include a carbon or stainless steel outer layer, a stainless steel inner layer, and one of an insulation layer and a splash curtain membrane layer on the stainless steel inner layer.

10. The gas processing container of claim 1 wherein the first range of temperatures is from 1500 degrees Celsius to 1700 degrees Celsius.

11. The gas processing container of claim 1, wherein the first seal is configured to resist pressure from an explosive blast.

12. A container for housing equipment to convert gaseous material to liquid, said container comprising:
   a plurality of walls forming a chamber having an air-tight seal, wherein equipment to convert a gaseous material to a liquid is in the chamber;
   a conduit seal assembly extending through a first wall of the plurality of walls, the conduit seal assembly comprising:
      an outer conduit having a first end with a first opening and a second end, opposite the first end, with a second opening;
      a first seal in the first opening, wherein said first seal resists a first range of temperatures;
      a second seal in the second opening, wherein said second seal resists a second range of temperatures that extends below the first range of temperatures, the first and second seals defining a cavity and providing an air-tight seal of the cavity; and
      a temperature-resistant internal boot that further protects the second end, wherein the temperature-resistant internal boot maintains flexibility at temperatures of −150° C. and below.

* * * * *